Aug. 8, 1967  C. A. FLARSHEIM  3,334,526
RECIPROCATING MECHANISM
Filed April 16, 1965
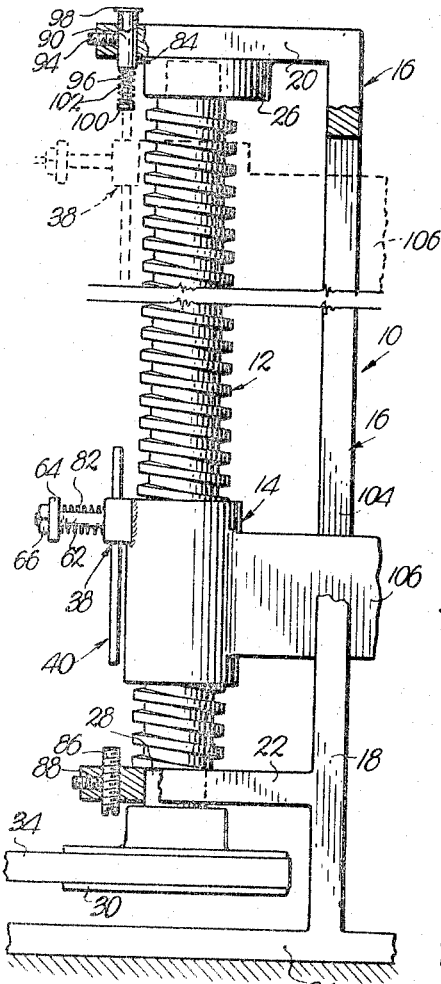
Fig. 1.
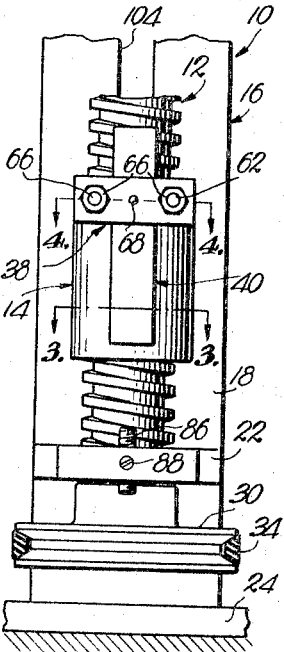
Fig. 2.
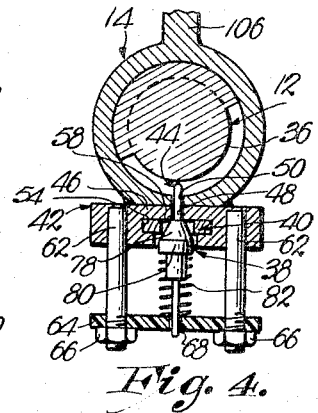
Fig. 3.
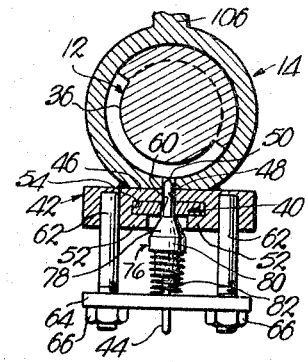
Fig. 4.
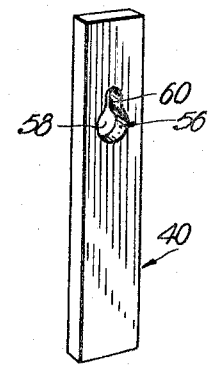
Fig. 5.
Fig. 6.
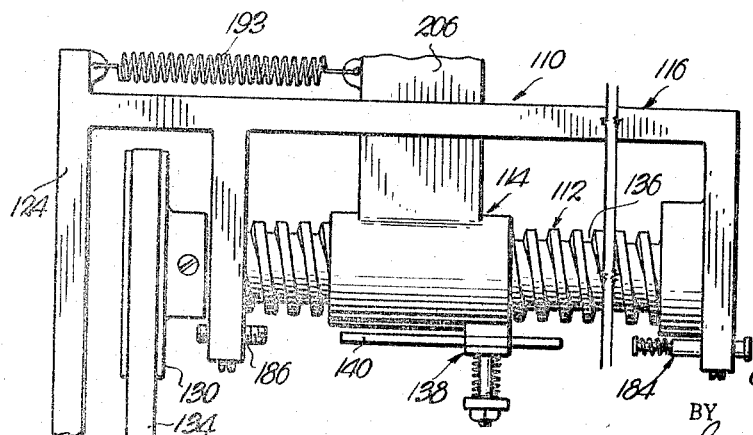
Fig. 7.
INVENTOR.
Clarence A. Flarsheim
BY
Hovey, Schmidt, Johnson & Hovey
ATTORNEYS.

United States Patent Office 3,334,526
Patented Aug. 8, 1967

3,334,526
RECIPROCATING MECHANISM
Clarence A. Flarsheim, 6131 Mission Drive,
Shawnee Mission, Kans. 66208
Filed Apr. 16, 1965, Ser. No. 448,735
20 Claims. (Cl. 74—424.8)

ABSTRACT OF THE DISCLOSURE

Reciprocating mechanism which includes a driven shaft having a spiral groove extending the length of the outer surface thereof, the shaft being rotatable about its longitudinal axis. The device to be reciprocated is selectively coupled to the shaft by a member which surrounds the shaft and which is coupled thereto for movement along the shaft in one direction by a reciprocable pin, movable into the groove by spring pressure, the pin being automatically removed from the groove by a camming assembly once the member has completed its travel in one direction. Upon removal of the pin from the groove the member moves in the opposite direction along the shaft to a point of engagement with an element which causes the pin to be automatically moved back into the groove and the reciprocation cycle continues.

This invention relates to power drive apparatus and has as its primary object the provision of an improved reciprocating mechanism which is not only simple and rugged in construction, and thereby economical to produce and maintain, but also is capable of being utilized in a number of different applications regardless of the length or inclination of the path of travel of the structure to be reciprocated.

Another object of this invention is the provision of reciprocating mechanism of the type described which is provided with improved coupling structure for use with a pair of relatively shiftable and rotatable members wherein one of the members is rotated to move the other member in one direction when the members are coupled together and the other member is movable in the opposite direction independently of said one member when the members are uncoupled from each other whereby reciprocable structure may be connected with said other member and reciprocated thereby.

Still another object of the present invention is the provision of coupling structure of the type described which utilizes the advantages of shiftable cam means whereby the coupling and uncoupling of the members may be made responsive to their relative positions to thereby preclude additional structure independent of the mechanism to accomplish this function.

A further object of this invention is the provision of a reciprocating mechanism of the aforesaid character wherein the shiftable member may return to a starting position under the action of gravity when it is uncoupled from the rotating member, whereby the members may be vertically disposed if desired to thereby obviate additional structures to return the shiftable member to the aforesaid position.

Yet another object of the present invention is the provision of a reciprocating mechanism of the above-mentioned character which is provided with bias means to return the shiftable member to an initial position after the members have been uncoupled, whereby the mechanism may be horizontally disposed or inclined as required by the path of movement of the structure to be reciprocated.

Other objects of this invention will become apparent as the following specification progresses, reference being had to the accompanying drawing, wherein:

FIGURE 1 is a side elevational view of one embodiment of the reciprocating mechanism;
FIG. 2 is a fragmentary, end elevational view thereof;
FIG. 3 is a cross-sectional view taken along line 3—3 of FIG. 2;
FIG. 4 is a cross-sectional view taken along line 4—4 of FIG. 2, and illustrating the coupling together of a pair of relatively shiftable members by a reciprocable pin;
FIG. 5 is a view similar to FIG. 4 but illustrating the disposition of the pin when the members are uncoupled;
FIG. 6 is a perspective view of a component of the structure for reciprocating the pin; and
FIG. 7 is a side elevational view of a second embodiment of the reciprocating mechanism.

One embodiment of the reciprocating mechanism of this invention is illustrated in FIGS. 1–6 and is denoted by the numeral 10. Mechanism 10 includes a pair of elongated members 12 and 14 which are relatively shiftable and rotatable. Member 14 is tubular and receives member 12 therein, member 12 having a length substantially greater than member 14 so as to normally project outwardly from opposed sides thereof.

Member 12 is mounted for rotation about its longitudinal axis on a support 16 comprised of an upright 18, a pair of lateral extensions 20 and 22, and a base 24 rigid to the bottom extremity of upright 18. An upper bearing 26 is carried by extension 20 for journaling the upper end of member 12, and a lower bearing 28 carried by extension 22 journals the lower end of member 12.

During the operation of mechanism 10, member 12 is to be rotated with respect to extensions 20 and 22 for a purpose to be described. Although the rotation of member 12 may be effected by any one of a number of different structures, a belt and pulley assembly 29 is disclosed herein for purposes of illustration only. Assembly 29 includes a pulley 30 secured to the lowermost end of member 12 between extension 22 and base 24, and an endless flexible belt 34 coupled with pulley 30 and adapted to be coupled to a source of power. To this end, belt 34 may be coupled with another pulley on the rotatable drive shaft of a prime mover, such as an electric motor or the like.

Member 12 is provided with a spiral groove 36 in the outer surface thereof which extends substantially the full length thereof as illustrated in FIG. 1. As shown in FIGS. 3–5, the inner surface of member 14 is in relatively close proximity to the outer surface of member 12 so that the latter may rotate with respect to member 14 while, at the same time, member 14 may move longitudinally of member 12.

Means for coupling and uncoupling members 12 and 14 includes structure 38 carried by member 14 and movable therewith in opposed directions along member 12. Structure 38, for purpose of illustration only, includes an elongated, rigid element 40, a rigid guide 42, and a pin 44 coupled with element 40 and guide 42 for movement with respect thereto into and out of groove 36.

Guide 42 is provided with a section 46 rigid to member 14 and having a central opening 48 aligned with a similar opening 50 through member 14 as shown in FIGS. 4 and 5. Guide 42 also has a pair of spaced projections 52 opposed to section 46 and forming with the latter a passage 54 for element 40, the latter being illustrated in FIG. 6. Element 40 is slidably received in passage 54 and is movable longitudinally of member 14 in opposed directions. Element 40 is provided with a keyhole-shaped opening 56 therethrough which is aligned with openings 48 and 50, and since element 40 is movable in passage 54, the larger and smaller portions 58 and 60 of opening 56 are movable alternately into alignment with opennigs 48 and 50.

A pair of rods 62 are secured to guide 42 and extend outwardly therefrom in a direction away from member 14. A strip 64 is shiftably carried on the outer ends of rods 62, and nuts 66 are threadably mounted on the outer ends of rods 62 to limit the outward movement of strip 64. As shown in FIG. 4, strip 64 is provided with an opening 68 aligned with openings 48 and 50.

Pin 44 extends through openings 48, 50 and 68, and is reciprocable with respect thereto, opening 68 serving to guide pin 44 when it reciprocates. Pin 44 is movable into and out of groove 36 to alternately couple and uncouple member 14 with member 12. Movement of pin 44 can be accomplished in different ways; however, in this case, pin 44 is disclosed as being movable out of groove 36 by a camming action and being returned to groove 36 by spring pressure. To this end, a boss 76 is carried on pin 44 intermediate its ends and between projections 52 of guide 42.

Boss 76 includes a conical part 78 and a cylindrical part 80, parts 78 and 80 extending axially of pin 44 and part 78 tapering inwardly as member 14 is approached. Part 78 cooperates with element 40 to provide the aforesaid camming action and, in this respect, part 78 is in the path of travel of element 40 when pin 44 is in groove 36. Thus, part 78 will be forced away from member 14 as the latter moves relatively to element 40 in one direction so that pin 44 will move into portion 60 of opening 56. Portion 60 has a transverse dimension smaller than the minimum transverse dimension of part 78 so that the latter will be forced laterally of element 40 as pin 44 moves into portion 60. The inclined plane relationship between element 40 and part 78 could be reversed if desired so that element 40 could be beveled at the boundary of opening 56 and part 78 could be of any configuration and would have an edge engaged by the beveled portion of element 40 so as to be cammed thereby.

A coil spring 82 spans the distance between one face of part 80 and the proximal face of strip 64 and is normally under compression to bias boss 76 and thereby pin 44 toward member 12. Spring 82 thus provides the spring pressure for moving pin 44 into groove 36 to thereby couple member 14 with member 12. As part 78 moves laterally of element 40 and away from member 14, spring 82 is further compressed and will hold part 78 in firm engagement with element 40 after part 78 has been cammed thereby into the position shown in FIG. 5. Element 40 will, therefore, not return to the disposition thereof shown in FIG. 4 until a longitudinally directed force is exerted thereon to move part 78 back into alignment with portion 58 of opening 56.

Spring 82 also biases strip 64 against nuts 66 and it is evident that the bias force of spring 82 may be varied by changing the positions of nuts 66 along respective rods 62. As shown in FIGS. 4 and 5, spring 82 remains substantially concentric with pin 44, regardless of the position of the latter relative to groove 36.

A pair of spaced, vertically aligned posts 84 and 86 are mounted on bearing 26 and extension 22 respectively to provide upper and lower stops or actuators for element 40. As shown in FIG. 1, posts 84 and 86 are aligned with the path of travel of element 40 so that the latter will engage post 84 as member 14 approaches one end of its path of travel, and element 40 will engage post 86 when member 14 approaches the opposite end of its path of travel. Post 86 is externally threaded and threadably coupled with extension 22. A setscrew 88 is provided to releasably maintain post 86 in a fixed position with respect to extension 22.

Post 84 includes a bushing 90 slidably carried within a bore 92 through extension 20 and releasably held in bore 92 by a setscrew 94. A stem 96 shiftably mounted in bushing 90 has a cap 98 at the upper end thereof for engaging bushing 90, and a foot 100 at the lower end thereof. A coil spring 102 is disposed between bushing 90 and foot 100 and is normally under compression to bias foot 100 away from extension 20. Cap 98 limits the downward movement of stem 96 under the influence of spring 102.

Post 86 is constructed in the foregoing manner to provide a snap action during the camming of part 78 by element 40. Such snap action is preferred because it assures that pin 44 will move into portion 60 of opening 56 as member 14 approaches the corresponding end of its path of travel. Since spring 82 holds part 78 firmly against element 40 when pin 40 is in portion 60, it is evident that pin 44 will not re-enter groove 36 until a longitudinal force is applied to element 40 to re-align part 78 with portion 58 of opening 56.

Element 40 will engage foot 100 as member 14 approaches the upper end of its path of travel and continued upward movement of member 14 will cause element 40 to shift stem 96 upwardly against the bias force of spring 102. Thus, element 40 will continue to move upwardly with member 14 until the bias force of spring 102 exceeds the frictional force between element 40 and part 78. When this occurs, spring 102 will force foot 100 downwardly to, in turn, move element 40 downwardly. This movement of element 40 will cause part 78 to be cammed laterally and away from member 14 so that pin 44 will move into portion 60 of opening 56. Spring 102 thus produces the snap action required to move pin 44 and part 78 into the above-mentioned positions.

Upright 18 is provided with a longitudinally extending slot 104 therein through which a projection 106 extends. Projection 106 is rigid to member 14 and is adapted to be operably coupled with apparatus to be reciprocated. Upright 18 thus serves to prevent rotation of member 14 as member 12 rotates relative to support 16.

In operation, mechanism 10 is mounted in the manner illustrated in FIGS. 1 and 2 with members 12 and 14 vertically disposed. Belt 34 is initially coupled to a source of power, such as the rotating drive shaft of an electric motor. With pin 44 extending into groove 36 in the manner shown in FIG. 4, rotation of member 12 will cause member 14 to move toward the dashed-line position of FIG. 1, while upright 18 prevents rotation of member 14 relative to support 16.

As member 14 approaches the dashed-line position of FIG. 1, element 40 will engage foot 100 and will move stem 96 upwardly and further compress spring 102 as member 14 continues to move upwardly. However, stem 96 will reach a position at which the frictional force between element 40 and part 78 will be exceeded by the bias force of spring 102 and, when this occurs, spring 102 will force foot 100 downwardly to, in turn, move element 40 downwardly with respect to member 14. Part 78 will thus be urged outwardly of member 14 and pin 44 will enter portion 60 of opening 56. As part 78 moves outwardly, pin 44 will move out of groove 36 and into the position thereof illustrated in FIG. 5 wherein the innermost end of pin 44 will clear the outer surface of member 12. Member 14 will thus gravitate and pin 44 will be prevented from re-entering groove 36 during the gravitation of member 14 by virtue of the pressure exerted by spring 82 on part 80 to hold part 78 in firm engagement with element 40.

As member 14 approaches the lower end of its path of travel, element 40 will engage the upper end of post 86 and will be effectively stopped thereby. However, member 14 continues to move downwardly with respect to element 40 to, in turn, carry pin 44 and boss 76 therewith. This action will cause pin 44 to move out of portion 60 of opening 56 and into portion 58 of this opening. Part 78 will thus become aligned with portion 58 once again and the bias force of spring 82 will urge boss 76 toward member 14 to, in turn, force pin 44 into groove 36. Since member 12 rotates continuously, member 14 will immediately commence to move upwardly as soon as pin 44 is in groove 36. The above described cycle of operation is repeated so long as member 12 is rotating. Thus, projection 106 and the apparatus coupled therewith are reciprocated along a path of travel defined by the distance between posts 84 and 86.

If pin 44 is aligned with the outer surface of member 12 as contrasted with groove 36 when spring 82 forces pin 44 toward member 12, the pin will engage the outer surface of member 12 for a short interval of time. During this interval, member 14 will not translate with respect to member 12. However groove 36 will eventually move into alignment with pin 44 and the latter will be immediately forced into the groove under the bias force of spring 82. For this reason, it is preferred that the biasing force be exerted on pin 44 by a yieldable component as distinguished from a rigid component, such as a rocker arm or the like, so as to prevent damage to the component or to the pin.

The speed of rotation of member 12 will, of course, determine the speed of upward movement of member 14. Since substantially all restraints are removed from member 14 when pin 44 is removed from groove 36, member 14 is a freely falling body and its terminal speed is determined by the length of its path of travel. The downward speed of member 14 may be increased or decreased, if desired, by the use of additional structure such as a weight coupled with member 14 by means of a pulley and cable assembly. Also, the speed of rotation of member 12 may be varied as desired. Similarly, the length of the path of travel of member 14 can be altered by varying the positions of posts 84 and 86 with respect to support 16. The length of element 40 with respect to its opening 56 also determines the path of travel of member 14.

The pitch of the spirally grooved portion of member 12 could be different along the length of the latter. By virtue of this feature, the speed of member 14 along member 12 could be varied.

Pin 44 does not engage member 12 at the bottom of groove 36 but is spaced therefrom when it is in the position of FIG. 4. Part 78 engages the inner surface of section 46 to limit the inward travel of pin 44.

A second embodiment of the reciprocating mechanism, denoted by the numeral 110, is illustrated in FIG. 7. Mechanism 110 is identical in all respects with mechanism 10 except that mechanism 110 is horizontally disposed in contrast to the vertical disposition of mechanism 10. Mechanism 110 includes relatively shiftable and rotatable members 112 and 114 which are horizontally disposed and are interconnected by structure 138 identical with structure 38 of mechanism 10. A projection 206 extends laterally from member 114 and is biased to the left in FIG. 7 by any suitable structure. In this case, this structure comprises a coil spring 193 coupled at the ends thereof to projection 206 and base 124 of support 116 on which member 112 is rotatably mounted.

In operation, the pin associated with structure 138 will be received within the groove 136 of member 112 so that, when member 112 is rotated by belt 134 coupled with pulley 130 to the proximal end of member 112, member 114 will move to the right when viewing FIG. 7 until element 140 engages post 184 similar in all respects to post 84 of mechanism 10. Post 84 forces the boss corresponding to structure 138 outwardly to, in turn, provide a camming action to move the pin out of groove 136. When this occurs, the pin will clear member 112 and spring 193 will return projection 206 and member 114 to the left. As element 140 engages post 186, member 114 will continue to move a short distance to the left until the pin is able to enter groove 136 once again under the influence of the bias force of spring 182 forming a part of structure 138.

Changes and modifications may be made to the structure of either of the foregoing embodiments without departing from the scope of the invention as delineated by the claims appended hereto.

Having thus described the invention, what is claimed as new and desired to be secured by Letters Patent is:

1. In a reciprocating mechanism:
  a pair of relatively movable members, one of said members being rotatable relative to the other member and having a surface adjacent to said other member, said surface having a spiral groove;
  pin means movably mounted on said other member and normally received within said groove for moving said other member in one direction relative to said one member as the latter rotates relative to said other member; and
  means coupled with said pin means for automatically removing the latter from said groove after said other member has moved to a predetermined position with respect to said one member, whereby said other member may move in the opposite direction relative to said one member without rotating the latter.

2. In a reciprocating mechanism as set forth in claim 1, wherein said one member is provided with a pair of vertically spaced ends, said position being adjacent to the upper of said ends, said other member being movable toward the lower of said ends under the action of gravity when said pin means is removed from said groove.

3. In a reciprocating mechanism as set forth in claim 1, wherein is provided means biasing said other member in said opposite direction.

4. In a reciprocating mechanism as set forth in claim 1, wherein said other member is movable in opposed directions between a pair of locations, and wherein is included means guiding said member between said locations.

5. In a reciprocating mechanism as set forth in claim 4, wherein is provided means for varying the distance between said locations.

6. In a reciprocating mechanism as set forth in claim 1, wherein said removing means includes cam structure movable relative to said members and responive to the relative position thereof.

7. In a reciprocating mechanism as set forth in claim 1, there being structure for automatically moving said pin means into said groove after said other member has moved through a predetermined distance in said opposite direction relative to said one member.

8. A reciprocating mechanism comprising:
  a pair of elongated members;
  means mounting one of the members for rotation about its longitudinal axis, said member having a spiral groove in its outer surface, the outer member being tubular and movably receiving said one member to permit said other member to move in opposed directions along and to be rotatable with respect to said one member;
  means coupled with said member for rotating the same;
  pin means movably carried by said other member and being movable into and out of said groove for moving said other member in one direction along said one member as the latter rotates and when said pin means is in said groove;
  actuatable structure coupled with said pin means for moving the latter out of said groove when said other member is in a first position after moving in said one direction and for moving said pin means into said groove when said other member is in a second position spaced from said first position after moving in the opposite direction; and
  means adjacent to each position respectively for actuating said structure.

9. A reciprocating mechanism as set forth in claim 8, wherein said pin means moves transversely of said members into and out of said groove, said structure including an element movable longitudinally of said members in said opposed directions.

10. A reciprocating mechanism as set forth in claim 8, wherein said structure includes relatively movable cam parts on said other member and said pin means respectively.

11. A reciprocating mechanism as set forth in claim 10, wherein one of said parts includes an element having an open therethrough, said opening defining a pair of spaced extremities and having a transeverse dimension which decreases as one extremity thereof is approached, the other part extending into said opening, being engageable with said element and being movable thereby to move said pin means out of said groove as said other part moves toward said one extremity when said structure is actuated by the respective actuating means.

12. A reciprocating mechanism as set forth in claim 11, wherein is provided means biasing said pin means into said groove, whereby said pin means will move into said groove as said other part moves away from said one extremity when said structure is actuated by the respective actuating means.

13. A reciprocating mechanism as set forth in claim 12, wherein said pin means is provided with a boss thereon intermediate the ends thereof, said structure including a strip spaced laterally from said parts, said bias means including a coil spring under compression between said boss and said strip.

14. A reciprocating mechanism as set forth in claim 12, wherein said bias means includes a spring disposed for applying a bias force to said pin means, and means coupled with said spring for changing the disposition of said spring to thereby permit variations in the bias force thereof.

15. A reciprocating mechanism as set forth in claim 8, wherein said actuating means at each position includes a stop, the distance between the ends of said groove being at least equal to the distance between the stops.

16. A reciprocating mechanism as set forth in claim 15, wherein each stop is adjustable, and including means releasably maintaining each stop in any one of a number of fixed operative locations, whereby the distance between the stops may be varied, one of said stops being mounted for movement longitudinally of the path of travel of said other member between a pair of spaced extremities and having means biasing said one stop toward one of said extremities, said structure being disposed to move said stop toward the other extremity as said other member moves toward said first position.

17. A reciprocating mechanism as set forth in claim 15, wherein said structure includes an elongated part movably mounted on said other member, said stops being in alignment with said part, one of the stops being disposed to move said part relative to said other member in a first direction to move said pin means out of said groove, the other stop being disposed to move said part relative to said other member in the direction opposite to said first direction to permit movement of said pin means into said groove, and means biasing said pin means toward said groove.

18. A reciprocating mechanism as set forth in claim 8, wherein is included guide means coupled with said other member for preventing the rotation thereof as said one member rotates.

19. A reciprocating mechanism comprising:
a support;
an elongated first member having a spiral groove in the outer surface thereof;
means mounting said first member on said support for rotation about the longitudinal axis of the first member with the ends of the latter being in vertically spaced relationship;
means coupled with said first member for rotating the same;
a tubular second member movably mounted on said first member for movement therealong and for rotation relative thereto, said second member having a side wall provided with an opening therethrough;
a pin;
means movably mounting said pin on said second member with the pin extending through said opening and being movable in opposed directions relative to said second member and thereby into and out of said groove, whereby said second member will move longitudinally of said first member as the latter rotates and when said pin is in said groove;
a boss rigidly secured to said pin intermediate the ends thereof, said boss including a conical part;
an elongated element movably mounted on said second member and having an opening therethrough aligned with the opening in said second member, said opening of said element having a pair of longitudinally spaced extremities and decreasing in transverse dimension as one extremity is approached to define a pair of interconnected portions, said pin extending through said opening of said element with said part being alternately alignable with said portions of the last-mentioned opening, said part being engageable with said element as said part moves into alignment with the smaller of said portions to thereby move said pin relative to said second member in one of said directions;
means coupled with said pin for biasing the same in the opposite direction, whereby the pin will move in said opposite direction as said part moves into alignment with the larger of said portions;
a pair of spaced stops secured to said support and defining the ends of the path of travel of said element, each stop being disposed to engage and move said element relative to said second member to thereby effect the alignment of said part with the corresponding portion, whereby said pin is moved relative to said second member; and
means guiding said second member to prevent rotation thereof as said first member rotates.

20. A reciprocating mechanism comprising:
a support;
an elongated first member having a spiral groove in the outer surface thereof;
means mounting said first member on said support for rotation about the longitudinal axis of the first member with the ends of the latter being in horizontally spaced relationship;
means coupled with said first member for rotating the same;
a tubular second member movably mounted on said first member for movement therealong and for rotation relative thereto, said second member having a side wall provided with an opening therethrough;
a pin;
means movably mounting said pin on said second member with the pin extending through said opening and being movable in opposed directions relative to said second member and thereby into and out of said groove, whereby said second member will move longitudinally of said first member as the latter rotates and when said pin is in said groove;
a boss rigidly secured to said pin intermediate the ends thereof, said boss including a conical part;
an elongated element movably mounted on said second member and having an opening therethrough aligned with the opening in said second member, said opening of said element having a pair of longitudinally spaced extremities and decreasing in transverse dimension as one extremity is approached to define a pair of interconnected portions, said pin extending through said opening of said element with said part being alternately alignable with said portions of the last-mentioned opening, said part being engageable with said element as said part moves into alignment with the smaller of said portions to thereby move said pin relative to said second member in one of said directions;

means coupled with said pin for biasing the same in the opposite direction, whereby the pin will move in said opposite direction as said part moves into alignment with the larger of said portions;

a pair of spaced stops secured to said support and defining the ends of the path of travel of said element, each stop being disposed to engage and move said element relative to said second member to thereby effect the alignment of said part with the corresponding portion, whereby said pin is moved relative to said second member;

means guiding said second member to prevent rotation thereof as said first member rotates, said pin being removable from said groove as said second member is adjacent one of the stops; and means biasing said second member toward the other of said stops, whereby the second member will move along said first member toward said other stop when said pin is removed from said groove.

References Cited
UNITED STATES PATENTS

| | | | |
|---|---|---|---|
| 2,393,764 | 1/1946 | Frank | 74—424.8 |
| 2,716,352 | 8/1955 | Wilson | 74—424.8 |
| 3,169,407 | 2/1965 | Newell | 74—424.8 |
| 3,248,963 | 5/1966 | Brewer | 74—424.8 |

ROBERT M. WALKER, *Primary Examiner.*

DAVID J. WILLIAMOWSKY, *Examiner.*

L. H. GERIN, *Assistant Examiner.*